United States Patent [19]

Luckevich et al.

[11] Patent Number: 5,511,867

[45] Date of Patent: Apr. 30, 1996

[54] METHOD AND SYSTEM FOR DRIVETRAIN OSCILLATION DETECTION AND CONTROL FOR ANTI-LOCK BRAKE SYSTEMS

[75] Inventors: Mark S. Luckevich, Ann Arbor, Mich.; Dan Negrin, Wiesbaden, Germany

[73] Assignee: Kelsey-Hayes Company, Livonia, Mich.

[21] Appl. No.: 437,436

[22] Filed: May 5, 1995

[51] Int. Cl.⁶ .................................................. B60T 8/32
[52] U.S. Cl. .......................... 303/191; 180/197; 303/158; 303/195; 303/169
[58] Field of Search ..................................... 303/158, 191, 303/194, 195, 196, 169, 157, 154, 174, 188, 189, 156; 180/197; 188/181 C, 181 A; 364/426.01, 426.02, 426.03

[56] References Cited

U.S. PATENT DOCUMENTS

4,992,945  2/1991  Kumpfmueller .................... 303/191 X

Primary Examiner—Douglas C. Butler
Attorney, Agent, or Firm—Brooks & Kushman

[57] ABSTRACT

A method and system for modifying anti-lock brake control to a vehicle experiencing drivetrain-induced oscillations. A wheel speed of each of the wheels is sensed to generate a corresponding speed signal. A drivetrain-induced oscillation condition is detected in one of two ways. First, a wheel speed peak count is determined for each of the wheels. A drivetrain-induced oscillation is then detected if multiple peaks occur within a predetermined period of time. Alternatively, a frequency of oscillation for each of the wheel speeds is determined and compared to a predetermined frequency threshold. Upon determining that the vehicle is experiencing drivetrain-induced oscillation during an ABS event, brake pressure is applied to the driven wheels at approximately the same frequency as the frequency of oscillation of the drivetrain-induced oscillation.

22 Claims, 7 Drawing Sheets

METHOD AND SYSTEM FOR DRIVETRAIN OSCILLATION DETECTION AND CONTROL FOR ANTI-LOCK BRAKE SYSTEMS

TECHNICAL FIELD

This invention relates to methods and systems for detecting drivetrain oscillation experienced by a vehicle during an anti-lock braking event and controlling the anti-lock brake system accordingly.

BACKGROUND ART

The objective of an anti-lock brake system (ABS) in a vehicle is to reduce the brake pressure at the different wheel brakes in case of excessive braking so that the wheels generate maximum brake force without locking. This aids in retaining vehicle stability and steerability while providing shorter stopping distances.

Typical anti-lock brake systems monitor the velocity at each of the wheels, decide whether the wheel is excessively slipping based on these velocity measurements, and modulate the braking pressure accordingly to avoid lock-up. Upon determining that a wheel is excessively slipping, the brake pressure is first reduced, maintained for a constant period of time, and finally increased until excessive wheel slip occurs again. The cycle of decreasing the brake pressure, maintaining constant brake pressure, and then increasing brake pressure is repeated until the anti-lock event ends. The frequency of this ABS cycling event typically occurs at about 3 Hz.

When the vehicle's drivetrain is engaged during an anti-lock braking event, brake torque is induced at the driven wheels by the drivetrain. When the ABS and the drivetrain braking occur simultaneously, there is an interaction or coupling that occurs. This interaction is most prevalent on low mu surfaces and has several undesirable effects. The first and most undesirable effect is a vibration in the drivetrain that is transferred to the vehicle and felt by the occupants. Another effect includes the introduction of excessive slip on the driven wheels which leads to instability in rear wheel drive vehicles or loss of steering control in front wheel drive vehicles. The overall effect is a roughness in ABS control which often leads to an increase in stopping distance.

The drivetrain vibration effect manifests itself as an oscillation in wheel speed that is at a higher frequency than the wheel speed oscillation induced by the cycling of the ABS. The drivetrain wheel speed oscillation frequency typically has a value that is more than twice the frequency of the ABS cycling. Therefore, a drivetrain-induced oscillation on the wheel speed typically has a frequency on the order of 8–10 Hz. The magnitude of the drivetrain oscillation is influenced by several factors including the ABS brake torque control. The magnitude decreases naturally with higher drive gears. Therefore, first and second gears show the largest magnitude, while the magnitude in third, fourth, and fifth gears is smaller.

One known prior art method of controlling the ABS upon detecting a drivetrain-induced oscillation includes delaying the pressure apply mode of the ABS cycle in order to dampen the wheel speed oscillations. A problem with this method is that if the oscillations are allowed to subside, then all indication of the drivetrain-induced oscillation will be lost. At this point, the system would revert to normal ABS control and eventually re-excite the drivetrain, causing the comfort and control problems to reappear. The system would once again have to detect the oscillations and revert to the modified control yielding a cyclic reoccurrence of the drivetrain influence.

SUMMARY OF THE INVENTION

The principal object of the present invention is to provide a method and system for detecting drivetrain oscillation and effectively controlling the ABS without re-exciting the drivetrain.

In carrying out the above object, the present invention provides a method for detecting a drivetrain-induced oscillation experienced by the vehicle during an anti-lock braking event. The method includes the steps of sensing a wheel speed of each of the wheels and determining whether the vehicle is experiencing drivetrain-induced oscillation. Upon determining that the vehicle is experiencing a drivetrain-induced oscillation, the method further includes the step of applying brake pressure to the driven wheels at approximately the same frequency as the frequency of oscillation of the drivetrain-induced oscillation.

In further carrying out the above object, features and advantages of the present invention, a system is also provided for carrying out the steps of the above-described method.

The above object, as well as other objects, features, and advantages of the present invention, are readily apparent from the following detailed description of the best mode for carrying out the invention when taken in connection with the accompanying drawings.

BEST MODES FOR CARRYING OUT THE INVENTION

Figure 1A:
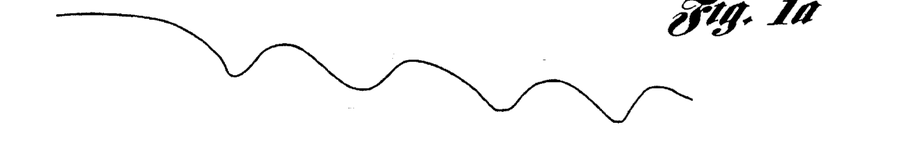
FIGS. 1a and 1b are wheel speed profiles of a wheel being controlled by an ABS system.
Figure 1B:
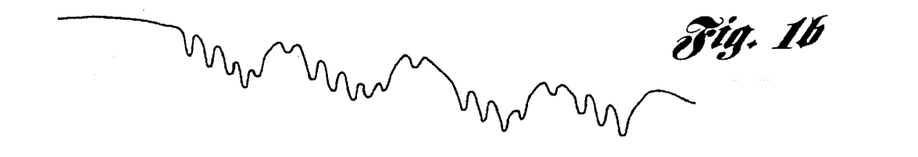

A wheel speed profile for a wheel being controlled by an ABS system is illustrated in FIG. 1a. The deep "wells" are caused by increasing brake pressure to the wheel until it exhibits a tendency toward instability and then releasing pressure so that the wheel can "recover" back to the vehicle speed. A similar wheel speed profile is shown in FIG. 1b, except now the drivetrain interaction can be seen as a high frequency oscillation. Left uncontrolled, this high frequency oscillation can dominate the wheel characteristics, forcing the ABS system to react to the drivetrain interaction, thereby degrading the ABS control performance.

Figure 2:
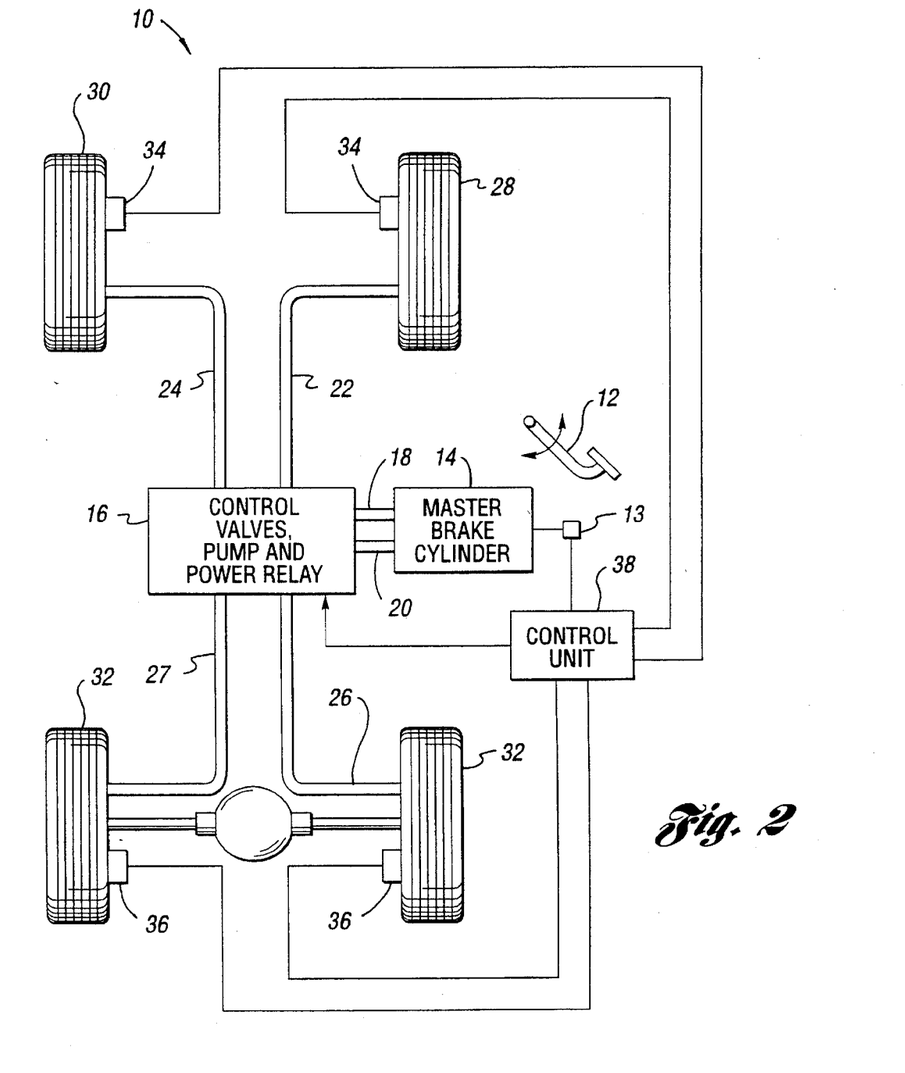
FIG. 2 is a schematic diagram of the anti-lock brake system for use with the preferred embodiment of the present invention.

Referring now to FIG. 2, a block diagram of a motor vehicle and the system of the present invention is shown, denoted generally by reference numeral 10, in conjunction with an ordinary passenger vehicle anti-lock brake system (ABS). The anti-lock brake system preferably includes a brake pedal 12, a brake switch 13, a brake master cylinder 14, control valves, pump and relay 16, brake fluid conduits 18, 20, 22, 24, 26 and 27, as well as a right front wheel 28, a left front wheel 30, and a pair of rear wheels 32.

The system 10 of the present invention preferably includes a pair of vehicle wheel speed sensors 34 for measuring the velocity of each of the front wheels 28 and 30, and a pair of vehicle wheel speed sensors 36 for measuring the velocity of each of the rear wheels 32. The system 10 further comprises an anti-lock brake system control unit 38. Each of the wheel sensors 34 and 36 are operatively connected to the control unit 38, which is itself operatively connected to the anti-lock brake system control valves, pump and power relay 16. Such operative connections are preferably electrical, but may be other types of connections, such as fiber optic.

The control unit 38 preferably takes the form of a commercially available microprocessor. Once programmed, the microprocessor control unit 38 functions as a control means for determining whether the vehicle is experiencing a drivetrain-induced oscillation, and controlling the ABS accordingly.

Figure 3A:
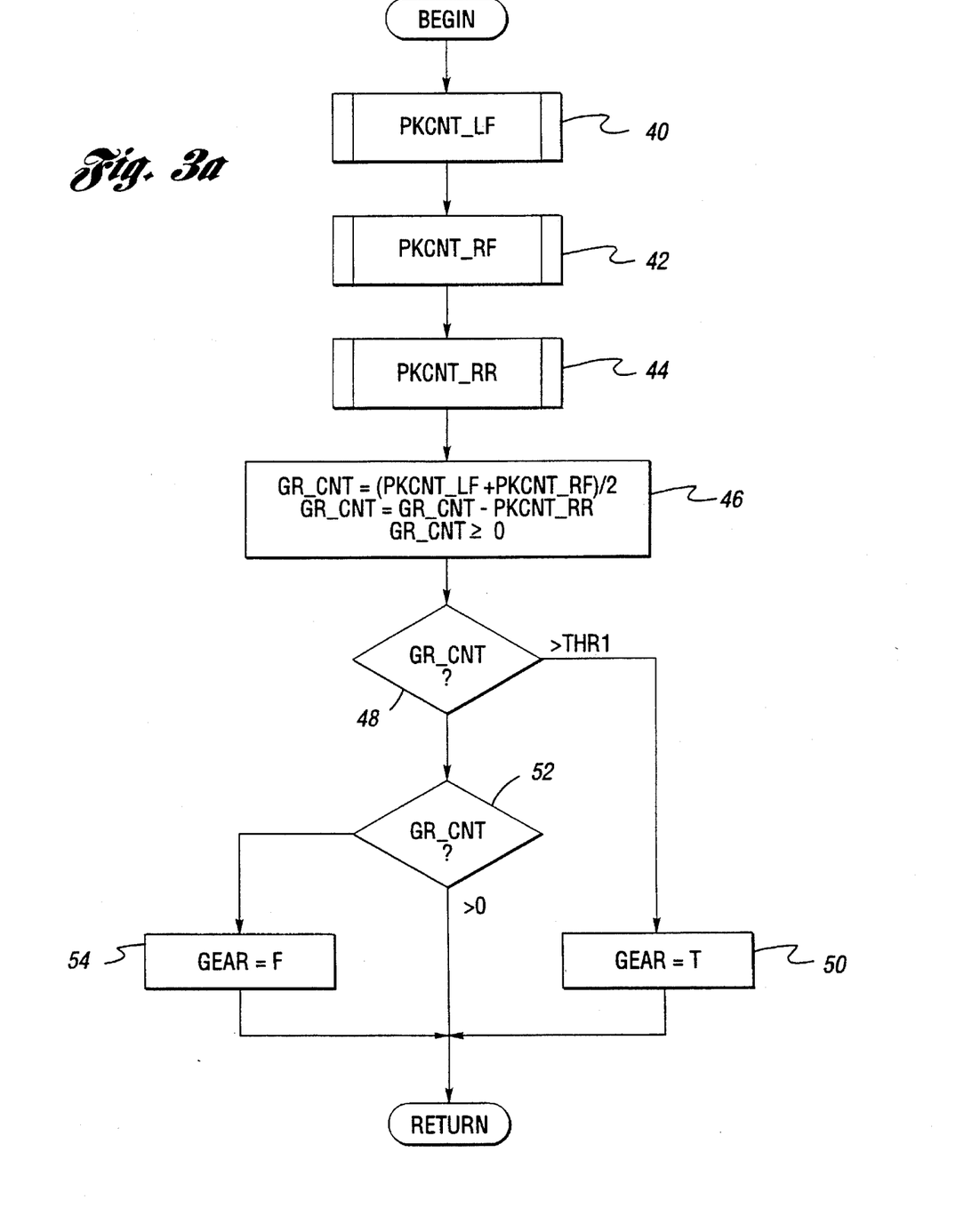
FIGS. 3a and 3b are block diagrams illustrating the general sequence of steps associated with the operation of one embodiment of the present invention in detecting drivetrain-induced oscillation.

Referring now to FIG. 3a, there is shown a block diagram illustrating the general sequence of steps associated with detecting drivetrain-induced oscillation. Wheel speed oscillation which results from drivetrain vibration can also occur on rough road surfaces. The key difference between an ABS stop on a rough road surface and a drivetrain-induced oscillation on a low mu surface is that the rough road surface will induce oscillation on all wheels, while the drivetrain-induced oscillation will occur only on the driven wheels. The frequency of oscillation is qualified by placing an acceleration and deceleration requirement on the wheel speed surrounding the peak.

The method begins with the step of determining a wheel speed peak count for the left front wheel 30, PKCNT_LF, the right front wheel 28, PKCNT_RF, and the rear wheels 32, PKCNT_RR, as shown by blocks 40, 42 and 44, respectively. Thereafter, an overall peak count, GR_CNT, is determined based on the wheel speed peak count determined for each of the wheels, as shown by block 46. The overall peak count is determined by averaging the wheel speed peak count determined for the driven wheels, i.e., the left front and right front wheels for a front-wheel drive vehicle, and subtracting the wheel speed peak count determined for the non-driven wheels, i.e., the rear wheels. Hereafter, the present invention is described for use with a front wheel drive vehicle. However, this invention also applies to a rear wheel drive vehicle, in which case the front and rear wheel designations are reversed.

The method continues with the step of determining whether the overall peak count exceeds a predetermined threshold, as indicated at conditional block 48. If conditional block 48 is true, the multiple peaks are indicative of a higher frequency oscillation, and a GEAR flag is set to true, thereby indicating a drivetrain-induced oscillation is detected, as shown by block 50. The GEAR flag is used to initiate modified ABS control when the vehicle is experiencing drivetrain-induced oscillation.

If conditional block 48 is false, the method continues with the step of determining whether the overall peak count is greater than zero, as shown by conditional block 52. If conditional block 52 is true, control is returned to the main program. If conditional block 52 is false, the GEAR flag is cleared and set to false, as shown by block 54.

Figure 3B:
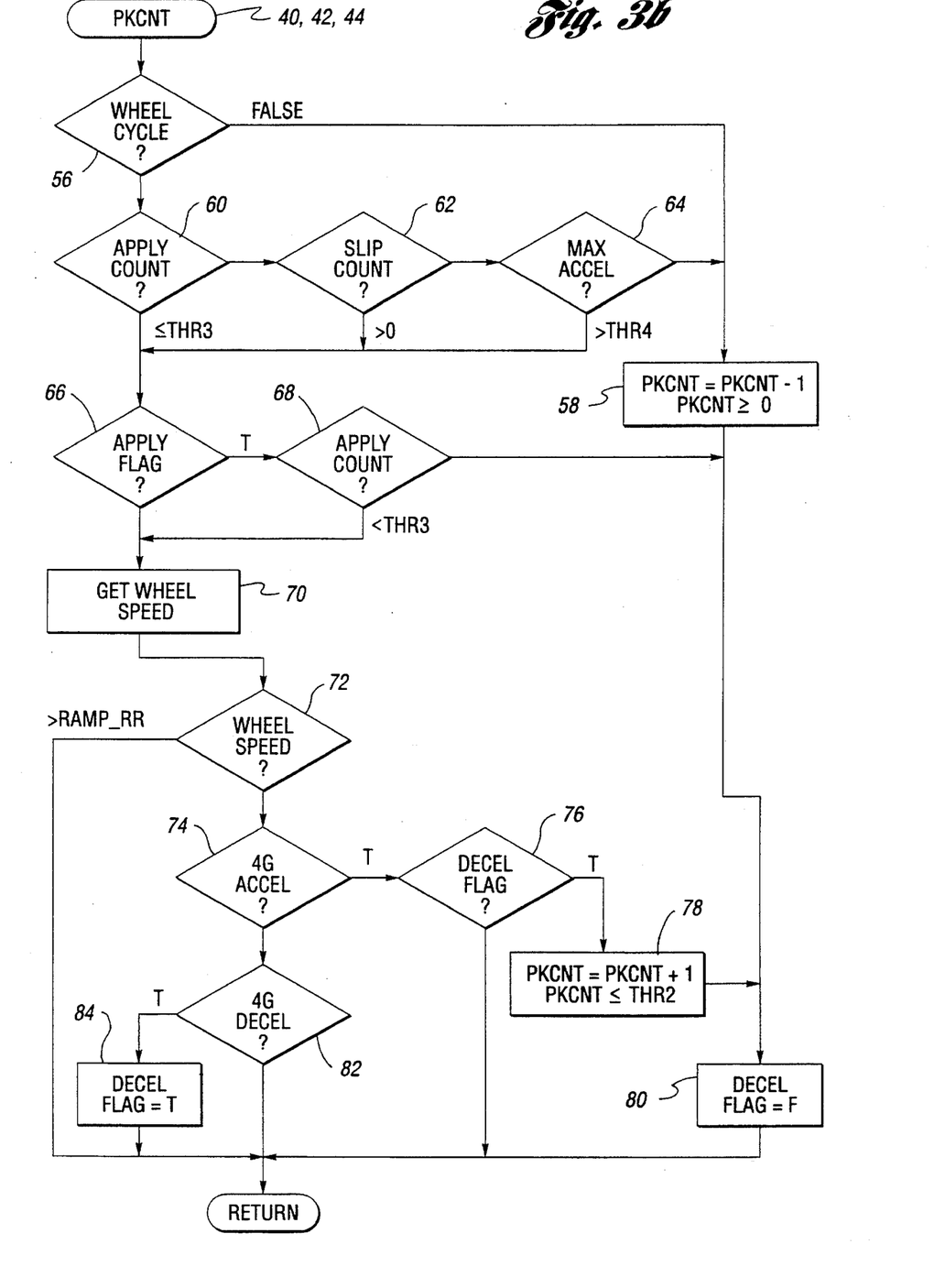

FIG. 3b illustrates the general sequence of steps associated with the wheel speed peak count, PKCNT, subroutine which is performed for each of the wheels. In the PKCNT subroutine, the peak counters are incremented and decremented based on the particular wheel's activity.

The peak count subroutine begins with the step of checking the wheel cycle to determine whether the wheel has had an initial departure and entered an ABS control mode, as shown by conditional block 56. If conditional block 56 is false, the peak counter is decremented, as shown by block 58.

If conditional block 56 is true, the wheel is under ABS control and the method continues to determine whether the pressure apply time of the pressure apply stage of ABS control exceeds a predetermined time threshold, THR3, as shown by conditional block 60. The predetermined time threshold indicates that the apply mode has continued past the time in which a drivetrain-induced deceleration and departure would have terminated. If the apply time exceeds the predetermined time threshold, the slip count check is used to ensure that the counter is only decremented once per departure cycle, as shown by conditional block 62. Slip count is cleared at the onset of the pressure dump mode (or departure) and is only equal to zero for that one occurrence during the cycle.

If the slip count is cleared, the method continues with the step of determining whether the wheel speed maximum acceleration, MAX_ACCEL, exceeds a predetermined acceleration threshold, THR4, as shown by conditional block 64. If conditional block 64 is false, the peak counter is decremented, as shown by block 58. Therefore, the peak counter will be decremented once per departure cycle if the apply counter for the particular wheel is greater than the predetermined time threshold and the maximum acceleration is below the predetermined acceleration threshold.

Figure 4A:
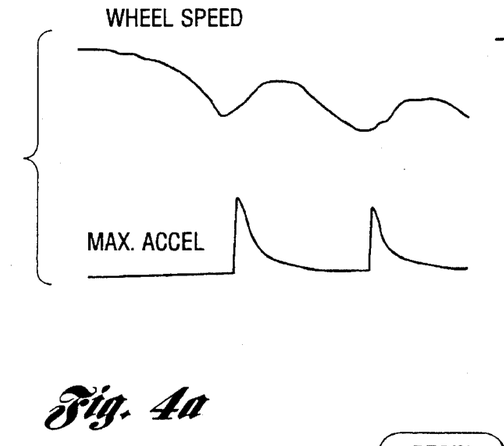
FIGS. 4a and 4b are wheel speed profiles with corresponding maximum acceleration signals.
Figure 4B:
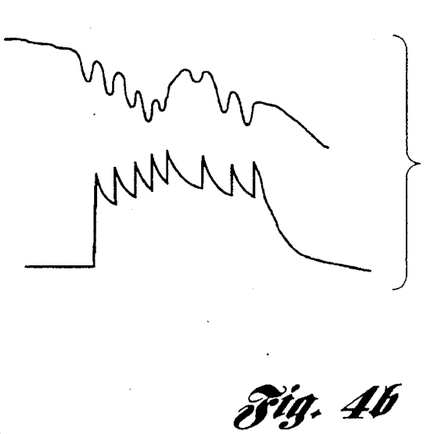

FIGS. 4a and 4b demonstrate how the wheel speed maximum acceleration, MAX_ACCEL, capture and filter mechanism works. When the wheel is recovering from a departure (or oscillation), the maximum acceleration is stored in the MAX_ACCEL variable. As long as the wheel acceleration is less than the stored value, then the stored value will be decayed with a fixed filter. A typical decay value is $15/16$. That is, the value will be decayed by $1/16$th of its previous value each iteration of the control processor. It is apparent in FIG. 4b that if the wheel continues to oscillate, the MAX_ACCEL parameter will not have a chance to decay below the threshold before another acceleration occurs and loads MAX_ACCEL with a larger value.

If any of the peak counter decrementing conditions are not met, then the peak count subroutine continues to determine if a peak has occurred and if the counter should be incremented. Two conditions must first be met before the wheel acceleration and deceleration is checked. First, if the ABS is in an apply mode on the particular wheel, as shown by conditional block 66 of FIG. 3b, then the apply counter must be less than the predetermined time threshold, THR3, before the second condition is checked, as shown by conditional block 68.

A drivetrain-induced braking torque generates slip on the front driven wheels, and, as a result thereof, the front wheel speeds will be below a speed of the rear wheels. Therefore, to help qualify the low mu drivetrain-induced oscillation, the wheel speed is compared to the rear wheel speed reference, RAMP_RR, as shown by block 70 and conditional block 72.

If the wheel is in slip, then the wheel acceleration is checked, as shown by conditional block 74. If the wheel acceleration exceeds a predetermined acceleration threshold, e.g., 4 g's, and there was previously a deceleration greater than 4 g's as indicated by the DECEL flag, as shown by conditional block 76, then the peak counter is incremented, as shown by block 78. The DECEL flag is used as an indication of a past deceleration greater than 4 g's. Once the counter has been incremented, then the DECEL flag is cleared, allowing for the detection of the next deceleration, as shown by block 80.

On the subsequent oscillation, or on the initial wheel deceleration if the ABS cycle has just begun, the wheel will not be accelerating and thus the wheel deceleration level is checked, as shown by conditional block 82. If the wheel is decelerating more than 4 g's, then the DECEL flag is set to true, as shown by block 84. The management of the DECEL flag facilitates the counting of each individual peak and ensures that the deceleration criterion was met.

The peak counter for each wheel is limited to a predetermined peak count threshold, THR2, as shown by block 78. This is done to facilitate the clearing of the GEAR flag if the oscillations are no longer present. If the peak counter is allowed to grow to a large value, then it would take too long for it to decrement down such that the GEAR flag could be cleared. Therefore, the limit on the peak counter will determine the number of normal ABS cycles which must occur before the GEAR flag will be cleared.

Figures 5A, 5B:
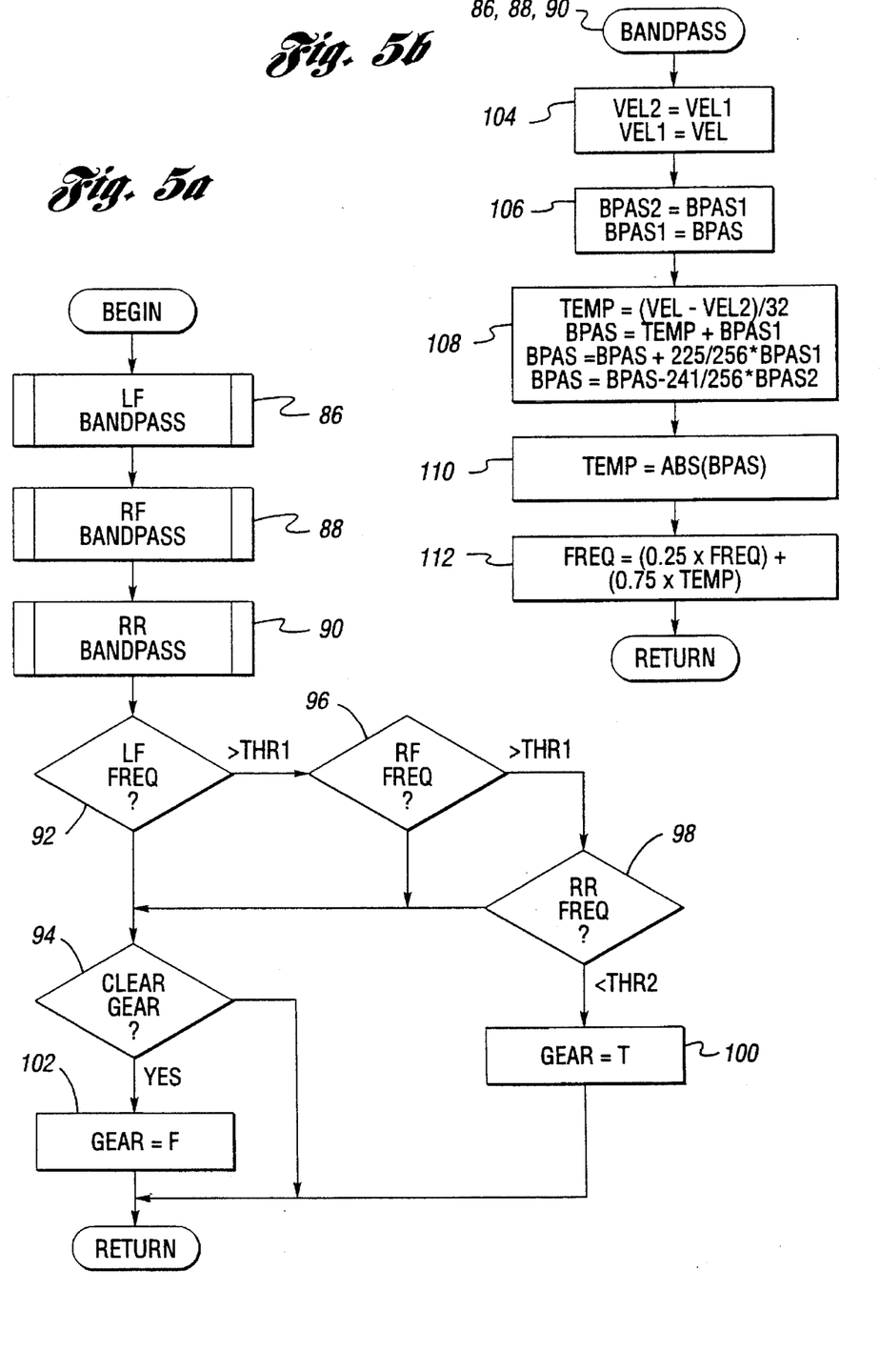
FIGS. 5a and 5b are block diagrams illustrating the general sequence of steps associated with the operation of a second embodiment of the present invention.

Referring now to FIGS. 5a and 5b, there is illustrated an alternative method for detecting drivetrain-induced oscillation experienced by a vehicle during an anti-lock braking event. A bandpass filter is applied to the wheel speed of the left front wheel 30, the right front wheel 28, and the rear wheels 32, as shown by blocks 86, 88 and 90, respectively.

The method proceeds to determine whether the frequency of oscillation of the driven wheels only exceeds a first predetermined frequency threshold. First, the frequency of oscillation of the left front wheel is compared to the first predetermined frequency threshold, THR1, as shown by conditional block 92. If conditional block 92 is false, the method continues to determined if the GEAR flag should be cleared, as shown by conditional block 94.

If conditional block 92 is true, the method continues to determine whether the frequency of oscillation of the right front wheel exceeds the first predetermined frequency threshold, THR1, as shown by conditional block 96.

If conditional block 96 is false, the method proceeds to conditional block 94. However, if conditional block 96 is true, the method continues to determine whether the frequency of oscillation of the rear wheels, or non-driven wheels, are below a second predetermined frequency threshold, THR2, as shown by conditional block 98. If conditional block 98 is true, the GEAR flag is set to true, as shown by block 100, and drivetrain-induced oscillation is detected.

If conditional block 98 is false, the method proceeds to conditional block 94. The gear flag is set to false, as shown by block 102, and control is returned to the main program.

FIG. 5b illustrates the general sequence of steps associated with the bandpass filtering of each of the wheel speeds.

Preferably, the bandpass filter has its center frequency equal to that of the drivetrain-induced oscillation, e.g., 8 Hz. The bandpass filter also has a fairly small bandwidth, e.g., 1–2 Hz, so that only the oscillations characteristic of the drivetrain interaction would be passed by the filter. By applying the bandpass filter to all three wheel speeds, the drivetrain-induced oscillation is identified by both front wheels having a large magnitude output of the bandpass filter while the rear wheel output would be small. This helps eliminate false detections on gravel, washboard, and other rough road surfaces.

In the s-domain (otherwise known as the frequency domain or the Laplace transform domain), the transfer function of a second order bandpass filter takes the form, $$H(s) = \frac{s}{s^2 + \xi s + \omega^2} \quad (1)$$

where, $\omega$ defines the center frequency in rad/sec, and $\xi$ defines the damping ratio which determines the filter bandwidth.

This filter gives a zero at the origin and a complex pair of poles. A bilinear or Tustin transformation is used to transform this continuous transfer function into its discrete digital equivalent in the z-domain. This is done by substituting for s as follows:

$$s = \frac{2}{T} \cdot \frac{Z-1}{Z+1} \quad (2)$$

where,

T is the sample frequency, e.g., 0.005 seconds.

After performing the algebra and substituting the constant factor a=2/T, the following digital transfer function is obtained:

$$H(z) = \frac{a(z^2 - 1)}{(a^2 + \xi a + \omega^2)z^2 + (2\omega^2 - 2a^2)z + (a^2 - \xi a + \omega^2)} \quad (3)$$

Due to the low frequencies involved in a drivetrain-induced oscillation, pre-warping of the digital transfer function is not deemed necessary. For implementation in a digital computer, the digital transfer function can be transformed into a recurrence equation which has the form, $$H(z) = \frac{Y(k)}{R(k)} \quad (4)$$

where,

Y(k) is the current frame filter output,

R(k) is the current frame filter input, and k is the frame place holder.

Substitution gives, $$Y(k)*\text{denominator}=R(k)*\text{numerator}. \quad (5)$$

The equation is solved for Y(k) by multiplying the equation by $z^{-2}$. Note that the operation $z^{-1}$ is equivalent to k−1 or a frame delay. The resulting recurrence equation is:

$$Y(k) = \frac{1}{(a+\xi+\omega^2/a)} * R(k) - \frac{1}{(a+\xi+\omega^2/a)} * R(k-2) - \frac{(2\omega^2/a - 2a)}{(a+\xi+\omega^2/a)} * Y(k-1) - \frac{(a-\xi+\omega^2/a)}{(a+\xi+\omega^2/a)} * Y(k-2) \quad (6)$$

For a center frequency of 8 Hz, $\omega=2\pi f=50.26$ and $\omega^2=2526$. A filter bandwidth of 2 Hz allows a range of 7–9 Hz of frequencies to pass. Also, a damping ratio of $\xi=12.56$ ($2\pi$*filter bandwidth) is assumed. The recurrence time is assumed to be T=0.005 seconds and the following recurrence equation is achieved:

$$Y(k) = 0.00239 * [R(k) - R(k-2)] + 1.879 * Y(k-1) - 0.94 * Y(k-2). \quad (7)$$

A problem encountered in the implementation in a digital computer is the fractional multiplies required in the recurrence equation. With 8 bit resolution, this does not pose too much of a problem for values greater than or equal to 0.004 as they can be realized as a portion in 256 counts. For example, a multiply by 0.9519 can be performed as a multiply by 244/256. This will not work for the coefficient of the filter input since it is very small (<1 part in 256). To increase the magnitude of this coefficient, a gain is applied to the filter. The gain should be sized so as to increase the coefficient by an order of magnitude. The gain will also have the effect of providing a magnitude of 1 at the center frequency. If a gain K=9.82 is added to the transfer function then only the value of the filter input coefficient will change and the following recurrence equation will result:

$$Y(k) = b\ 0.03 * [R(k) - R(k-2)] + 1.8790 * Y(k-1) - 0.9400 * Y(k-2) \quad (8)$$

Figure 6A:
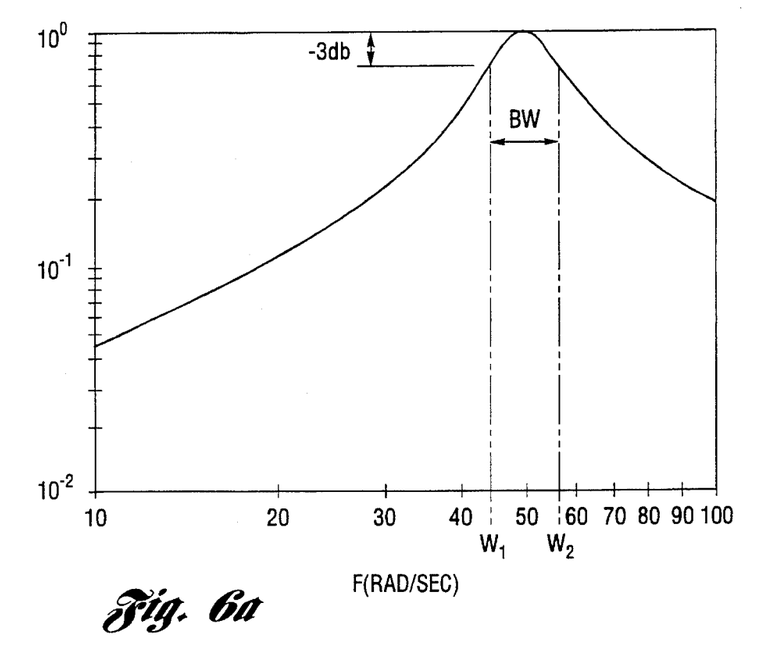
FIGS. 6a and 6b are Bode plots of the transfer function of the preferred filter used in the method of the present invention.
Figure 6B:
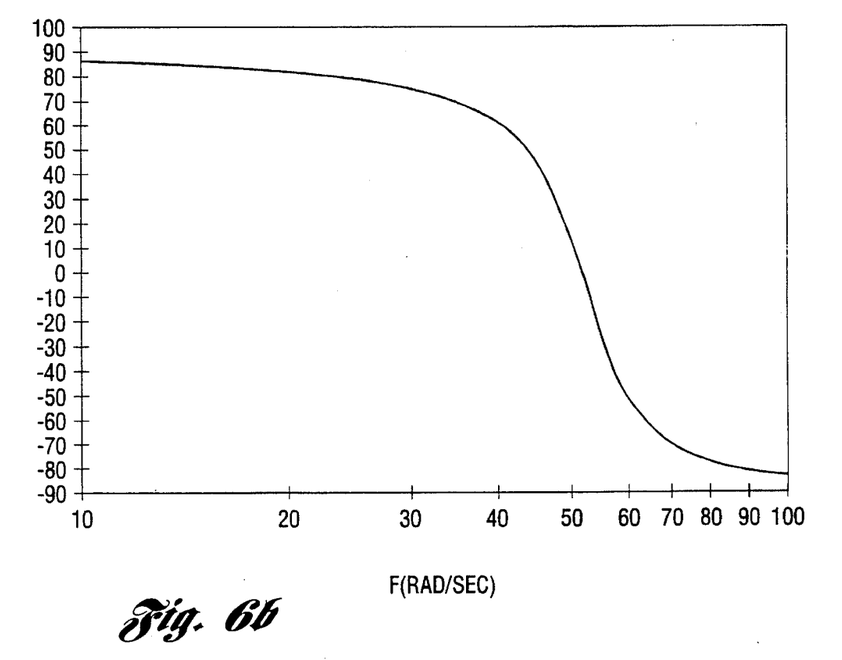

A Bode plot of the equivalent transfer function is shown in FIGS. 6a and 6b. The magnitude plot is shown in FIG. 6a, while the phase plot is shown in FIG. 6b. The bandwidth can be observed as the difference between the frequencies $\omega 1$ and $\omega 2$ which correspond to the half power points on the magnitude plot of FIG. 6a. The half power point is defined as the frequency at which the magnitude is 3 dB below the peak magnitude. The magnitude units can be converted to dB with the equation $20\ \log_{10} Y$.

Returning now to FIG. 5b, a block diagram of the implementation of the bandpass filter routine is shown. First, the raw wheel speed, VEL, for the wheel for which the routine is being run is obtained from RAM memory along with the previous two values, as shown by block 104. The VEL signal corresponds to the R(k) values of the recurrence equation. That is, VEL corresponds to R(k), VEL1 corresponds to R(k-1) and VEL2 corresponds to R(k-2). The previous values of the bandpass filter output, BPAS, are also obtained from memory, as shown by block 106. The correlation to the recurrence equation is as follows:

BPAS corresponds to Y(k),

BPAS1 corresponds to Y(k-1), and

BPAS2 corresponds to Y(k-2).

The method continues with the step of solving the recurrence equation (8) for Y(k), as shown by block 108. A temporary storage variable, TEMP, is established to hold the intermediate values calculated for the bandpass filter. As shown in block 108, TEMP is first loaded with the input term of the recurrence equation where (VEL-VEL2)/32 corresponds to 0.03*[R(k)-R(k-2)]. The next two lines of the equation correspond to the second term of the recurrence equation or the contribution of the previous filter output. Therefore, the term 1.879*Y(k-1), (which is equal to Y(k-1)+0.879*Y(k-1)) is implemented by BPAS1+225/256*BPAS1. This is then added to the TEMP variable containing the first term and then loaded into BPAS. The third term of the recurrence equation is then subtracted from the BPAS variable generating the final filter output. The third term 0.94*Y(k-2) is represented by 241/256*BPAS2.

The output of the bandpass filter, BPAS, is a sinusoidal signal with a frequency of 8 Hz. This signal cannot be altered as it is needed for the bandpass filter calculation on subsequent loops. For the setting of the GEAR flag, it is necessary to modify this signal and thus a new variable is created. The new variable, FREQ, is generated as shown in blocks 110 and 112. First, the TEMP variable is used to store the absolute value of the bandpass filter output, BPAS, which effectively rectifies the signal. This value is then filtered with a low pass filter generating a continuous signal which can then be compared to the frequency threshold. The low pass filter is shown in block 112 where the filter output, FREQ, is the result of 25% of the previous low pass filter output, plus 75% of the filter input, TEMP. The output of block 112 is the signal compared to the first and second frequency thresholds, as shown by blocks 92, 96 and 98 of FIG. 5a.

For a second order filter, 5 bytes of RAM are required per wheel channel to store the past values of the filter input and output which are required in determining the frequency of oscillation of each of the wheel speeds. To improve upon the bandpass filter characteristics, a third or fourth order filter may be used.

Once the drivetrain-induced oscillation has been detected, the ABS pressure control must be modified to optimize the system performance. Therefore, the method concludes with the step of applying brake pressure to the driven wheels at approximately the same frequency as the frequency of oscillation of the drivetrain-induced oscillation upon determining that the vehicle is experiencing a drivetrain-induced oscillation.

In addition, the magnitude of the oscillation must be maintained at a small level to prevent excessive slip and vibration. There are several benefits to this approach. First, the detection of a drivetrain-induced oscillation is effectively latched by maintaining the 8 Hz oscillation. Second, the peak detector will continue to increment the counters and keep them saturated at the threshold level. Third, the vehicle stability and control will be maintained since the driven wheel slip will be relatively small and constant.

Figure 7:
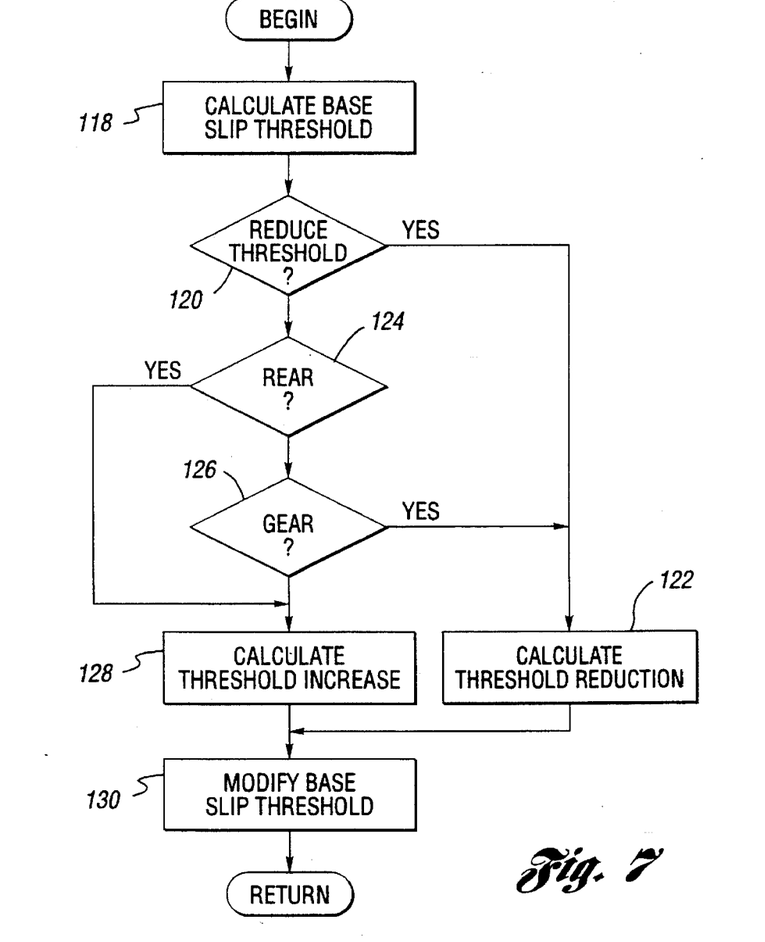
FIG. 7 is a block diagram illustrating the general sequence of steps associated with determining a slip threshold.

To help ensure that the magnitude of the oscillation remains small, the slip threshold is reduced so that the pressure reduction phase (or dump mode) is allowed to occur sooner. Referring now to FIG. 7, a block diagram illustrating the general sequence of steps associated with modifying the slip threshold is shown. A base slip threshold is first calculated for determining whether a wheel is becoming unstable, as shown by block 118.

Based on a number of wheel characteristics and vehicle conditions, a decision is made whether or not the base slip threshold should be reduced, as shown by conditional block 120. Typically, the base slip threshold is not reduced after a departure or before ABS has been activated. If block 120 is true, the method continues with the step of determining a threshold reduction, as shown by block 122.

If block 120 if false, the method continues with the step of determining if the routine is being run for the rear wheels, as shown by conditional block 124. If the routine is being run for the rear wheels, or nondriven wheels, the GEAR flag check is bypassed. If the routine is being run for the driven wheels, or the front wheels, then the GEAR flag is checked. If the GEAR flag is set, the threshold increase will be bypassed as shown by conditional block 126, and a threshold reduction is determined, as shown by block 122.

If block 126 is false, the method continues with the step of determining a threshold increase, as shown by block 128. The increase is typically based on the MAX_ACCEL term described earlier. The use of MAX_ACCEL helps to desensitize the system on rough road surfaces and after a wheel recovery, since it is large during these periods. This desensitization must be bypassed for the drivetrain-induced oscillation condition since the value of MAX_ACCEL will be high from the drivetrain oscillations and the main objective is to reduce the slip threshold for this condition.

At the end of this routine, the base slip threshold is modified with the increase or decrease factor, as shown by block 130. The reduced slip threshold used during the drivetrain-induced oscillation condition helps determine when the pressure reduction (or dump mode) will occur and, thus, helps determine the amplitude of the oscillation. Waiting too long to dump pressure will allow more wheel slip and possibly increase the oscillation amplitude by allowing more energy in the form of brake pressure to be added to the system.

Figure 8:
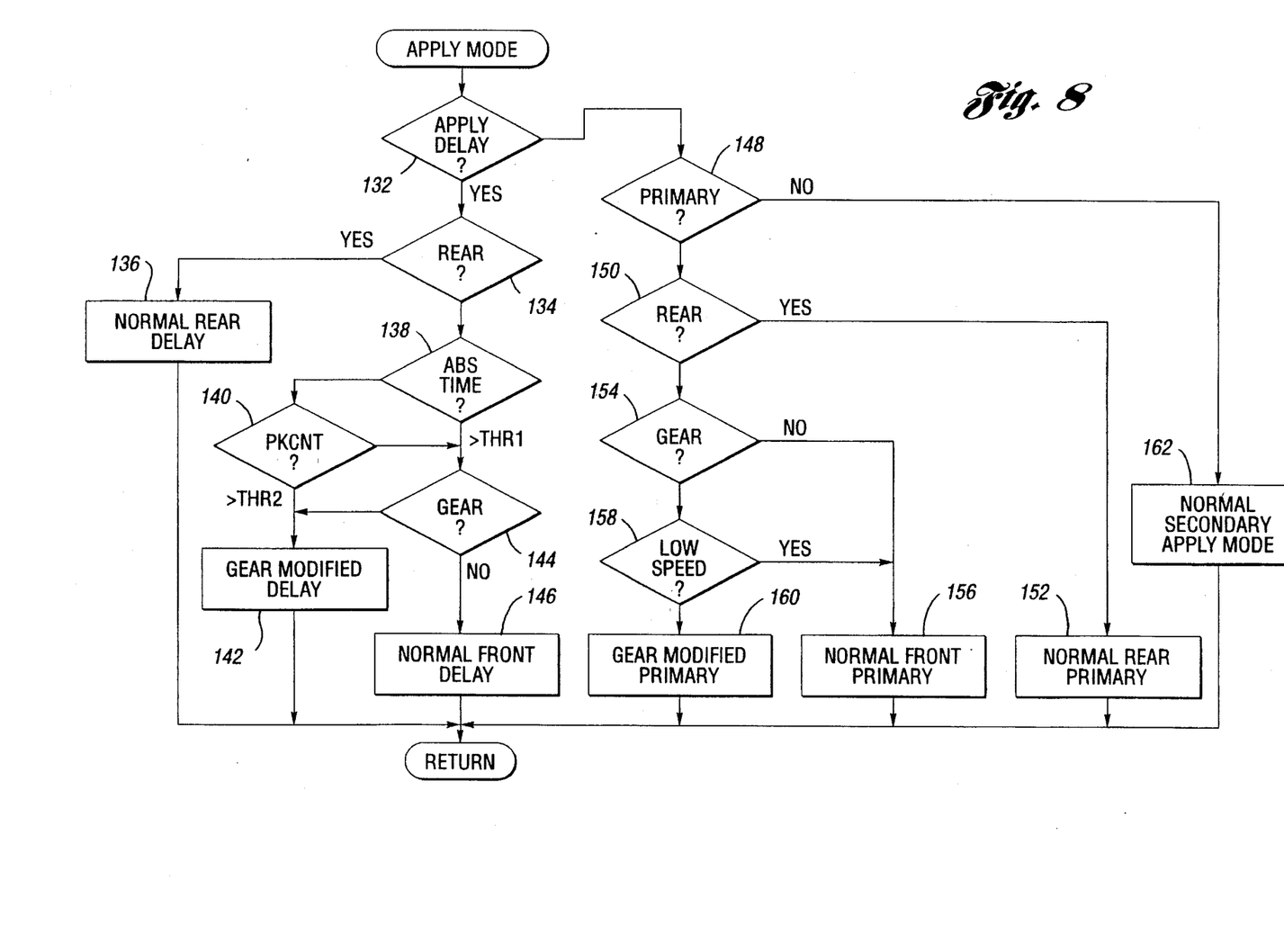
FIG. 8 is a block diagram illustrating the general sequence of steps associated with determining the modified pressure apply stage of the ABS control when the vehicle is experiencing drivetrain-induced oscillation.

In addition to timing the pressure reduction phase with the slip threshold modification, the pressure apply mode must also be adjusted to both time the application of pressure and to regulate the rate of the pressure apply mode. A block diagram illustrating the general sequence of steps associated with regulating the rate of the pressure apply mode is shown in FIG. 8.

Before the primary apply pulse of the pressure apply mode is executed, a decision is made as to whether a delay is to occur before the apply mode is executed, as shown by conditional block 132. During normal ABS control, the delay is calculated based on wheel departure and recovery characteristics. If a drivetrain-induced oscillation condition is detected, an open-loop delay is selected. The delay time is chosen so as to time the application of the primary apply pulse to keep the drivetrain oscillating. Generally, this coincides with the point that the wheel starts to decelerate after recovering from the previous oscillation.

If conditional block 132 is true, the method continues to determine whether the routine is being run for the rear wheels, or non-driven wheels, as shown by conditional block 134. If conditional block 134 is true, the normal delay is applied to the rear wheels, as shown by block 136.

If conditional block 134 is false, the method proceeds to check the ABS time, as shown by conditional block 138. A gear modified apply delay, or an additional hold mode, can be used before the GEAR flag is set in order to improve the system control. This logic is based on the peak counter for each individual wheel and is only used during the activation of ABS. If an ABS stop is performed while the vehicle is in gear on a low mu surface, there will be enough energy input into the brake/drivetrain system to induce several oscillations of the wheel speeds. If apply pulses are allowed to occur during this time, then the magnitude of the oscillations will be increased with no benefit to the ABS control. Therefore, as shown by conditional block 138 in FIG. 8, the ABS time is compared to a predetermined time threshold, THR1, representative of the early stages of ABS.

If the ABS time is below the predetermined time threshold, the peak counter, PKCNT, is compared to a predetermined counter threshold, THR2, as shown by conditional block 140. The predetermined counter threshold is typically set to one, indicating that an oscillation has been detected. If the peak counter exceeds the predetermined counter threshold, the gear modified apply delay time is selected, as shown by block 142 so as to allow for the next drivetrain-oscillation to occur without the influence of an apply pulse. If the oscillation was caused by a drivetrain interaction, then the GEAR flag will eventually be set and use of the gear modified apply delay time will continue. If the GEAR flag is not set, as is the case when the first oscillation is caused by some other effect like a rough road surface, then the apply pulse will eventually be executed and normal ABS control will resume using the normal front delay on subsequent applies, as shown by block 146.

If the ABS time exceeds the predetermined time threshold or if the peak counter does not exceed the predetermined counter threshold, the method proceeds to determine whether the GEAR flag is set, as shown by conditional block 144. If the GEAR flag is set, the method proceeds to select the gear modified apply delay time, as shown by block 142. If the GEAR flag is not set, then the normal front apply delay is used, as shown by block 146.

Returning now to block 132, if the apply delay has expired or has not been selected, the method continues to determine whether the ABS is executing the primary apply pulse, as shown by conditional block 148. If conditional block 148 is true, the method proceeds to determine whether the routine is being run for the rear wheels, or non-driven wheels, as shown by block 150. If conditional block 150 is true, the normal primary apply pulse is executed on the rear wheels, as shown by conditional block 152.

If the method is being run for the front wheels, or driven wheels, the method continues to determine whether the GEAR flag is set, as shown by conditional block 154. If conditional block 154 is false, the normal primary apply pulse is applied to the front wheels, as shown by block 156.

If the GEAR flag is set, the method continues to determine whether the vehicle is at a low speed, as shown by conditional block 158. If conditional block 158 is true, the normal primary apply pulse is applied to the front wheels as shown by block 156.

If the vehicle is not at a low speed, a modified primary apply pulse is applied to the front wheels, as shown by block 160. As described earlier, the modified primary pulse has a small fixed width so as to maintain the drivetrain oscillations.

Once the primary apply pulse ceases to excite the drivetrain, the secondary apply mode is executed, as shown by block 162. The secondary apply mode is identical to that used for normal ABS control. In this mode, additional apply pulses are generated to force the next wheel departure. The pulses are small and therefore will not induce an excessive departure depth if the vehicle is still in gear. If the driver has depressed the clutch or taken the vehicle out of gear, then the secondary apply mode will continue until wheel instability occurs. The lengthened apply time facilitates clearing of the GEAR flag and returning the system to normal ABS control.

While the best mode for carrying out the invention has been described in detail, those familiar with the art to which this invention relates will recognize various alternative designs and embodiments for practicing the invention as defined by the following claims.

What is claimed is:

1. A method for detecting drivetrain-induced oscillation having a predetermined frequency experienced by a vehicle during an anti-lock braking event and controlling an anti-lock brake system accordingly, the vehicle having a plurality of wheels including at least one driven wheel and at least one non-driven wheel and the anti-lock brake system capable of cyclic control of brake pressure, the method comprising:

sensing a wheel speed of the wheel and generating a corresponding wheel speed signal;

determining whether the vehicle is experiencing drivetrain-induced oscillation based on the wheel speed signal;

if the vehicle is experiencing drivetrain-induced oscillation, applying brake pressure having a predetermined magnitude to the driven wheel at approximately the same frequency as the frequency of oscillation of the drivetrain-induced oscillation.

2. The method of claim 1 wherein the step of determining whether the vehicle is experiencing drivetrain-induced oscillation comprises:

determining a frequency of oscillation for the driven wheel and the non-driven wheel;

determining whether the frequency of oscillation of the driven wheel exceeds a first predetermined frequency threshold; and determining whether the frequency of oscillation of the non-driven wheel exceeds a second predetermined frequency threshold.

3. The method of claim 2 wherein the step of determining the frequency of oscillation includes the step of bandpass filtering the wheel speed.

4. The method of claim 3 wherein the step of bandpass filtering is performed utilizing a bandpass filter having a center frequency equal to the frequency of the drivetrain-induced oscillation, the bandpass filter further having a predetermined coefficient.

5. The method of claim 4 wherein the step of bandpass filtering further includes applying a gain to the bandpass filter so as to increase the predetermined coefficient by an order of magnitude.

6. The method of claim 1 wherein the step of determining whether the vehicle is experiencing drivetrain-induced oscillation comprises:

determining a wheel speed peak count for the driven wheel and the non-driven wheel during a predetermined time based on the wheel speed signal;

determining an overall peak count based on the determined wheel speed peak count; and determining whether the overall peak count exceeds a predetermined count threshold.

7. The method of claim 6 wherein the step of determining the overall peak count includes averaging the wheel speed peak count determined for the driven wheel and subtracting the wheel speed peak count determined for the non-driven wheel.

8. The method of claim 6 wherein step of determining the wheel speed peak count comprises:

determining an acceleration of the wheel based on the wheel speed signal;

measuring a time duration defined in terms of an anti-lock brake system cycle for the wheel;

determining whether the speed of the wheel exceeds a non-driven wheel speed reference;

if the speed of the wheel does not exceed a non-driven wheel speed reference, determining whether the acceleration of the wheel exceeds a predetermined acceleration threshold; and if the acceleration of the wheel exceeds the predetermined acceleration threshold, incrementing the wheel speed peak count.

9. The method of claim 8 wherein the time duration is the time duration of a pressure apply stage of the anti-lock brake system cycle.

10. The method of claim 6 wherein step of determining the wheel speed peak count further comprises:

determining a peak acceleration of the wheel;

measuring a time duration defined in terms of an anti-lock brake system cycle for the wheel;

determining whether the time duration exceeds a predetermined time threshold;

if the time duration exceeds the predetermined time threshold, determining whether the peak acceleration exceeds a predetermined peak acceleration threshold; and if the peak acceleration does not exceed the predetermined peak acceleration threshold, decrementing the wheel speed peak count.

11. The method of claim 10 wherein the time duration is the time duration of a pressure apply stage of the anti-lock brake system cycle.

12. A system for detecting drivetrain oscillation having a predetermined frequency experienced by a vehicle during an anti-lock braking event and controlling an anti-lock brake system accordingly, the vehicle having a plurality of wheels, the wheels including at least one driven wheel and at least one non-driven wheel, and the anti-lock brake system capable of cyclic control of brake pressure, the system comprising:

a speed sensor for sensing the speed of the wheel and for generating a corresponding wheel speed signal; and means for determining whether the vehicle is experiencing drivetrain-induced oscillation based on the wheel speed signal; and means for applying brake pressure having a predetermined magnitude to the driven wheels at approximately the same frequency as the frequency of oscillation of the drivetrain-induced oscillation if the vehicle is experiencing drivetrain-induced oscillation.

13. The system of claim 12 wherein the means for determining whether the vehicle is experiencing drivetrain-induced oscillation comprises:

means for determining a frequency of oscillation of the driven wheel and the non-driven wheel;

means for determining whether the frequency of oscillation of the driven wheel exceeds a first predetermined frequency threshold; and means for determining whether the frequency of oscillation of the non-driven wheel exceeds a second predetermined frequency threshold.

14. The system of claim 13 wherein the frequency of oscillation is determined by bandpass filtering the wheel speed.

15. The system of claim 14 wherein the bandpass filter includes a center frequency equal to the frequency of the drivetrain-induced oscillation, the bandpass filter further having a predetermined coefficient.

16. The system of claim 15 wherein the bandpass filter is implemented by applying a gain to the bandpass filter so as to increase the predetermined coefficient by an order of magnitude.

17. The system of claim 12 wherein the means for determining whether the vehicle is experiencing drivetrain-induced oscillation comprises:

means for determining a wheel speed peak count for the driven wheel and the non-driven wheel during a predetermined time based on the wheel speed signal;

means for determining an overall peak count based on the wheel speed peak count; and means for determining whether the overall peak count exceeds a predetermined count threshold.

18. The system of claim 17 wherein the overall peak count is determined by averaging the wheel speed peak count determined for the driven wheel and subtracting the wheel speed peak count determined for the non-driven wheel.

19. The system of claim 17 wherein the means for determining the wheel speed peak count comprises:

means for determining an acceleration of the wheel based on the wheel speed signal;

means for measuring a time duration defined in terms of an anti-lock brake system cycle for the wheels;

means for determining whether the speed of the wheel does not exceed a non-driven wheel speed reference;

means for determining whether the acceleration of the wheel exceeds a predetermined acceleration threshold; and means for incrementing the wheel speed peak count.

20. The system of claim 19 wherein the time duration is the time duration of a pressure apply stage of the anti-lock brake system cycle.

21. The system of claim 17 wherein the means for determining the wheel speed peak count further comprises:

means for determining a peak acceleration of the wheel;

means for measuring a time duration defined in terms of an anti-lock brake system cycle for the wheel;

means for determining whether the time duration exceeds a predetermined time threshold;

means for determining whether the peak acceleration exceeds a predetermined peak acceleration threshold; and means for decrementing the wheel speed peak count.

22. The system of claim 21 wherein the time duration is the time duration of a pressure apply stage of the anti-lock brake system cycle.

* * * * *